United States Patent
Helbing

[19]

[11] Patent Number: 6,157,432
[45] Date of Patent: Dec. 5, 2000

[54] HEATED FERROELECTRIC LIQUID CRYSTAL SPATIAL LIGHT MODULATOR WITH IMPROVED CONTRAST, IMPROVED GRAYSCALE RESOLUTION, AND DECREASED PIXEL STICKING WHEN OPERATED IN A NON-DC BALANCED MODE

[75] Inventor: Rene P. Helbing, Palo Alto, Calif.

[73] Assignee: Hewlett-Packard Company, Palo Alto, Calif.

[21] Appl. No.: 09/240,065

[22] Filed: Jan. 29, 1999

[51] Int. Cl.[7] .................................................... C09K 19/02
[52] U.S. Cl. .............................. 349/172; 349/21; 349/25; 349/72; 349/161
[58] Field of Search ................................. 349/21, 25, 72, 349/161, 172

[56] References Cited

U.S. PATENT DOCUMENTS

| | | | |
|---|---|---|---|
| 4,119,842 | 10/1978 | Hayden et al. | 250/201 |
| 4,634,225 | 1/1987 | Haim et al. | 350/331 T |
| 4,775,221 | 10/1988 | Baumgartner et al. | 350/331 T |
| 5,088,806 | 2/1992 | McCartney et al. | 359/84 |
| 5,247,374 | 9/1993 | Terada | 359/44 |
| 5,731,797 | 3/1998 | Akiyama et al. | 345/97 |
| 5,744,819 | 4/1998 | Yamamoto et al. | 257/59 |
| 5,767,934 | 6/1998 | Goddard | 349/61 |
| 5,781,266 | 7/1998 | Nakao et al. | 349/172 |
| 6,016,173 | 1/2000 | Crandall | 349/25 |

*Primary Examiner*—William L. Sikes
*Assistant Examiner*—Tarifur R. Chowdhury

[57] ABSTRACT

A heated ferroelectric liquid crystal-based spatial light modulator (SLM) that minimizes pixel sticking when operated in a non-DC-balanced mode with spiking and method for using same. The SLM comprises a transparent electrode, a pixellated electrode, ferroelectric liquid crystal material, and a heater. The ferroelectric liquid crystal material is sandwiched between the transparent electrode and the pixellated electrode. The heater is capable of heating the ferroelectric material to at least 40° C. and preferably to between 50 and 60° C. The invention may also provide a temperature sensor for detecting the temperature of the SLM and a temperature control circuit that is electrically connected to both the temperature sensor and the heater. The temperature sensor may be a diode located proximate to the pixellated electrode or a photo-diode located remote from the spatial light modulator. The heater may be integrated into and encapsulated by a substrate supporting the pixellated electrode or it may be supported on a second major surface of the substrate. The method according to the invention includes providing a SLM, preheating the SLM, and operating the SLM in a non-DC-balanced mode with spiking while monitoring and maintaining the a temperature of the SLM above 50° C.

23 Claims, 9 Drawing Sheets

FIG. 1A
(PRIOR ART)

(PRIOR ART)

HEATED FERROELECTRIC LIQUID CRYSTAL SPATIAL LIGHT MODULATOR WITH IMPROVED CONTRAST, IMPROVED GRAYSCALE RESOLUTION, AND DECREASED PIXEL STICKING WHEN OPERATED IN A NON-DC BALANCED MODE

FIELD OF THE INVENTION

The invention relates to ferroelectric liquid crystal-based spatial light modulators such as those used in video displays and in particular relates to such spatial light modulators having a substantially decreased pixel sticking.

BACKGROUND OF THE INVENTION

A need exists for various types of video and graphics display devices with improved performance and lower cost. For example, a need exists for miniature video and graphics display devices that are small enough to be integrated into a helmet or a pair of glasses so that they can be worn by the user. Such wearable display devices would replace or supplement the conventional displays of computers and other devices. A need also exists for a replacement for the conventional cathode-ray tube used in many display devices including computer monitors, conventional and high-definition television receivers and large-screen displays. Both of these needs can be satisfied by display devices that incorporate a light valve that uses as its light control element a spatial light modulator based on a ferroelectric liquid crystal (FLC) material.

FLC-based spatial light modulators are available in either a transmissive form or in a reflective form. The transmissive spatial light modulator is composed of a layer of a FLC material sandwiched between two transparent electrodes. The FLC material is preferably a surface-stabilized FLC material. One of the electrodes is segmented into an array of pixel electrodes to define the picture elements (pixels) of the transmissive spatial light modulator. The direction of an electric field applied between each pixel electrode and the other electrode determines whether or not the corresponding pixel of the transmissive spatial light modulator rotates the direction of polarization of light falling on the pixel. The transmissive spatial light modulator is constructed as a half-wave plate and rotates the direction of polarization through 90° so that the polarized light transmitted by the pixels of the spatial light modulator either passes through a polarization analyzer or is absorbed by the polarization analyzer, depending on the direction of the electric field applied to each pixel.

Reflective spatial light modulators are similar in construction to transmissive spatial light modulators, but use reflective pixel electrodes and have the advantage that they do not require a transparent substrate. Accordingly, reflective spatial light modulators can be built on a silicon substrate that also accommodates the drive circuits that derive the drive signals for the pixel electrodes from the input video signal. A reflective light valve has the advantage that its pixel electrode drive circuits do not partially occlude the light modulated by the pixel. This enables a reflective light valve to have a greater light throughput than a similar-sized transmissive light valve and allows larger and more sophisticated drive circuits to be incorporated.

As with the transmissive spatial light modulators, the direction of an electric field (in this case between the transparent electrode and the reflective electrode) determined whether or not the corresponding pixel of the reflective spatial light modulator rotates through 90° the direction of polarization of the light falling on (and reflected by) by the pixel. Thus, the polarized light reflected by the pixels of the reflective spatial light modulator either passes through a polarization analyzer or is absorbed by the polarization analyzer, depending on the direction of the electric field applied to each pixel.

The resulting optical characteristics of each pixel of both the transmissive and reflective spatial light modulators are binary: each pixel either transmits light (its 1 state) or absorbs light (its 0 state), and therefore appears light or dark, depending on the direction of the electric field.

To produce the grey scale required for conventional display devices, the apparent brightness of each pixel is varied by temporally modulating the light transmitted by each pixel. The light is modulated by defining a basic time period that will be called the illumination period of the spatial light modulator. The pixel electrode is driven by a drive signal that switches the pixel from its 1 state to its 0 state. The duration of the 1 state relative to the duration of the illumination period determines the apparent brightness of the pixel.

Ferroelectric liquid crystal-based spatial light modulators (both transmissive and reflective) suffer the disadvantage that, after each time the drive signal has been applied to a pixel electrode to cause the pixel to modulate the light passing through it, the DC balance of the pixel must be restored or a condition called "pixel sticking" will eventually result. Pixel sticking is a condition where a pixel will not change states despite a change in the direction of an electric field applied between a pixel electrode and the other electrode.

When operated in the DC balanced mode, pixel sticking is not problematic. This is done by defining a second basic time period called the balance period, equal in duration to the illumination period, and driving the pixel electrode with a complementary drive signal having 1 state and 0 state durations that are complementary to the 1 state and 0 state durations of the drive signal during the illumination period. The illumination period and the balance period collectively constitute a display period. To prevent the complementary drive signal from causing the display device to display a substantially uniform, grey image, the light source illuminating the light valve is modulated so that the light valve is only illuminated during the illumination period, and is not illuminated during the balance period. However, modulating the light source as just described reduces the light throughput of the light valve to about half of that which could be achieved if DC balance restoration were unnecessary. This means that a light source of approximately twice the intensity, with a corresponding increase in cost, is necessary to achieve a given display brightness. Additionally or alternatively, projection optics with a greater aperture, also with a corresponding increase in cost, are necessary to achieve a given brightness.

Figure 1A:
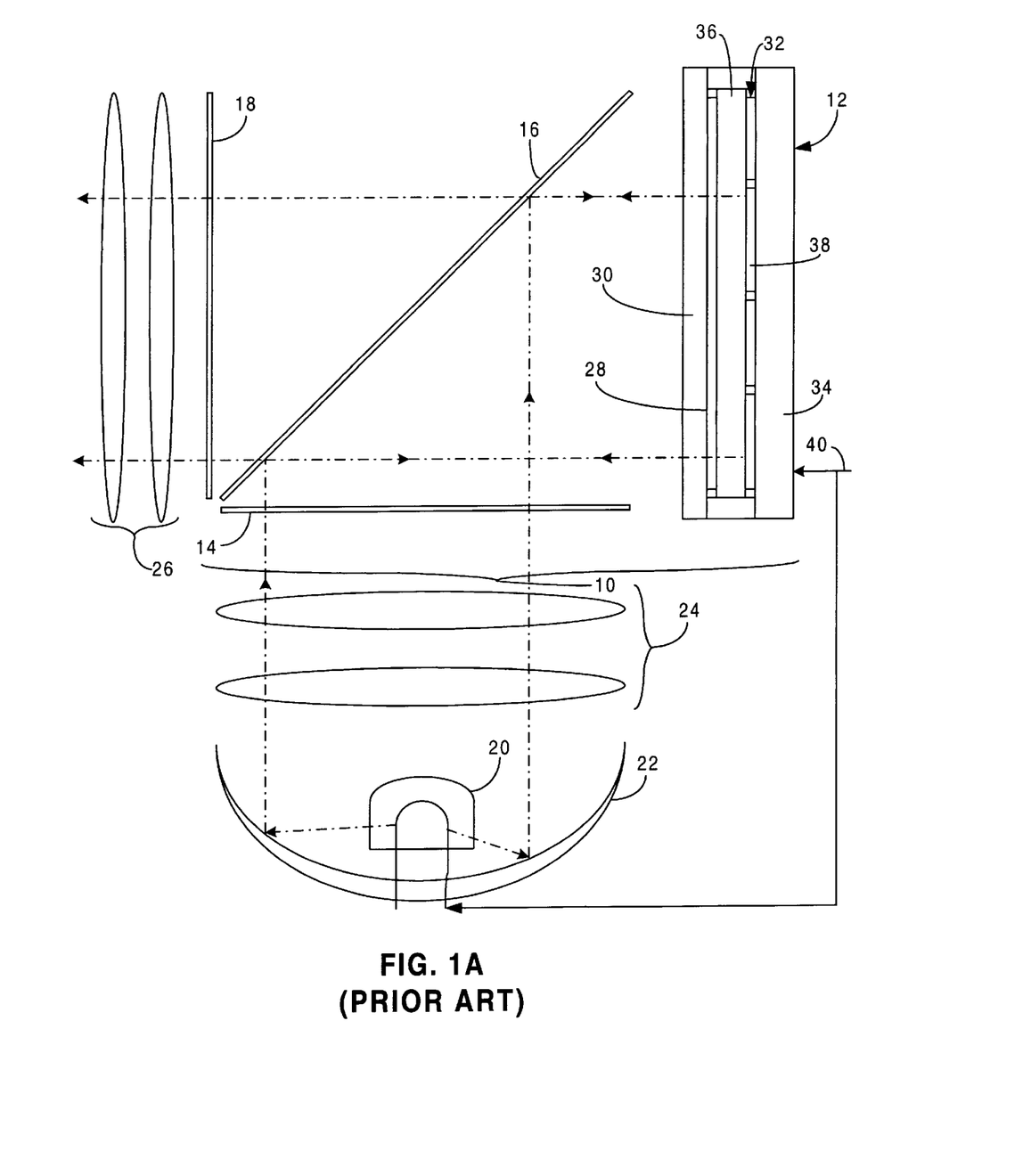
FIG. 1A is a schematic diagram of part of a display device incorporating a conventional reflective light valve.

FIG. 1A shows part of a display device incorporating a conventional reflective light valve 10 that includes the reflective spatial light modulator 12. Other principal components of the light valve are the polarizer 14, the beam splitter 16 and the analyzer 18. The light valve is illuminated with light from the light source 20, the efficiency of which may be improved using a reflector 22 and collector optics 24 that concentrate the light towards the polarizer 14. The light output by the light valve passes to the output optics 26 that focus the light to form an image (not shown). The light valve, light source (including reflector and collector optics)

and output optics may be incorporated into various types of display device, including miniature, wearable devices, cathode-ray tube replacements, and projection displays.

Light generated by the light source 20 passes through the polarizer 14. The polarizer polarizes the light output from the light source. The beam splitter 16 reflects a fraction of the polarized light output from the polarizer towards the spatial light modulator 12. The spatial light modulator is divided into a two-dimensional array of picture elements (pixels) that define the spatial resolution of the light valve. The beam splitter transmits a fraction of the light reflected by the spatial light modulator to the analyzer 18.

The direction of an electric field in each pixel of the spatial light modulator 12 determines whether or not the direction of polarization of the light reflected by the pixel is rotated by 90° relative to the direction of polarization of the incident light. The light reflected by each pixel of the spatial light modulator passes through the beam splitter 16 and the analyzer 18 and is output from the light valve depending on whether or not its direction of polarization was rotated by the spatial light modulator. The light output from the light valve 10 passes to the output optics 26.

The light source 20 may be composed of LEDs. The LEDs are of three different colors in a color display. Other light-emitting devices whose output can be rapidly modulated may alternatively be used as the light source 20. As a further alternative, a white light source and a light modulator (not shown) may be used. The light modulator modulates the amplitude of the light generated by the light source to define the illumination period and balance period of the spatial light modulator. In a light valve for use in a color display device, the light modulator additionally modulates the color of the light output from the light source.

The polarizer 14 polarizes the light generated by the light source 20. The polarization is preferably linear polarization. The beam splitter 16 reflects the polarized light output from the polarizer towards the spatial light modulator 12, and transmits to the analyzer 18 the polarized light reflected by the spatial light modulator. The direction of maximum transmission of the analyzer is orthogonal to that of the polarizer in this example.

The spatial light modulator 12 is composed of the transparent electrode 28 deposited on the surface of the transparent cover 30, the reflective electrode 32 located on the surface of the semiconductor substrate 34, and the ferroelectric liquid crystal layer 36 sandwiched between the transparent electrode and the reflective electrode. The reflective electrode is divided into a two-dimensional array of pixel electrodes that define the pixels of the spatial light modulator and of the light valve. A substantially reduced number of pixel electrodes are shown to simplify the drawing. For example, in a light valve for use in a large-screen computer monitor, the reflective electrode could be divided into a two-dimensional array of 1600×1200 pixel electrodes. An exemplary pixel electrode is shown at 38. Each pixel electrode reflects the portion of the incident polarized light that falls on it towards the beam splitter 16.

A drive circuit (not shown), which may be located in the semiconductor substrate 34, applies a drive signal to the pixel electrode of each pixel of the spatial light modulator 12. The drive signal has two different voltage levels, and the transparent electrode 28 is maintained at a fixed potential mid-way between the voltage levels of the drive signal. The potential difference between the pixel electrode and the transparent electrode establishes an electric field across the part of the liquid crystal layer 36 between the pixel and transparent electrodes. The direction of the electric field determines whether the liquid crystal layer rotates the direction of polarization of the light reflected by the pixel electrode, or leaves the direction of polarization unchanged.

The reflective spatial light modulator 12 is structured as a quarter-wave plate in contrast to a transmissive spatial light modulator, which is structured as a half-wave plate. This difference arises because light passes through the reflective spatial light modulator twice, once before and once after reflection by the reflective pixel electrodes. The thickness of the layer of ferroelectric liquid crystal material in the liquid crystal layer 36 is chosen to provide an optical phase shift of 90° between light polarized parallel to the director of the liquid crystal material and light polarized perpendicular to the director. The liquid crystal material is preferably a Smectic C* surface stabilized ferroelectric liquid crystal material having an angle of 22.5° between its director and the normal to its smectic layers. Reversing the direction of the electric field applied to such a liquid crystal material switches the director of the material through an angle of about 45°. Consequently, if the director is aligned parallel to the direction of maximum transmission of the analyzer 18 with one polarity of the electric field, reversing the direction of the electric field will rotate the direction of polarization of light reflected by the pixel through 90°. This will align the direction of polarization of the light perpendicular to the direction of maximum transmission of the analyzer, and will change the pixel from its 1 state, in which the pixel appears bright, to its 0 state, in which the pixel appears dark.

In a miniature, wearable display, the output optics 26 are composed of an eyepiece that receives the light reflected by the reflective electrode 32 and forms a virtual image at a predetermined distance in front of the user (not shown). In a cathode-ray tube replacement or in a projection display, the output optics are composed of projection optics that focus an image of the reflective electrode on a transmissive or reflective screen (not shown). Optical arrangements suitable for use as an eyepiece or projection optics are well known in the art and will not be described here.

Since the direction of maximum transmission of the analyzer 18 is orthogonal to the direction of polarization defined by the polarizer 14, light whose direction of polarization has been rotated through 90° by a pixel of the spatial light modulator 12 will pass through the analyzer and be output from the light valve 10 whereas light whose direction of polarization has not been rotated will not pass through the analyzer. The analyzer only transmits to the output optics 26 light whose direction of polarization has been rotated by pixels of the spatial light modulator. The pixels of the spatial light modulator will appear bright or dark depending on the direction of the electric field applied to each pixel. When a pixel appears bright, it will be said to be in its 1 state, and when the pixel appears dark, it will be said to be in its 0 state.

The direction of maximum transmission of the analyzer 18 can alternatively be arranged parallel to that of the polarizer 14,and a non-polarizing beam splitter can be used as the beam splitter 16. In this case, the spatial light modulator 12 operates in the opposite sense to that just described.

To produce the grey scale required by a display device notwithstanding the binary optical characteristics of the pixels of the light valve 10, the apparent brightness of each pixel is varied by temporally modulating the light reflected by the pixel, as described above. The drive circuit (not shown) for each pixel of the spatial light modulator determines the duration of the 1 state of the pixel in response to a portion of the input video signal 40 corresponding to the location of the pixel in the spatial light modulator.

Figure 1B:
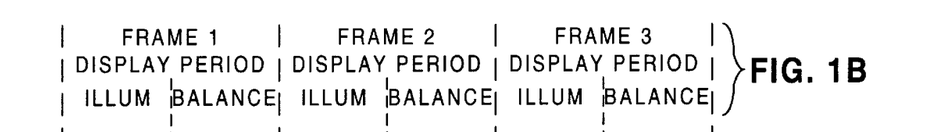
FIGS. 1B–1G illustrate the operation of the conventional reflective light valve shown in FIG. 1A in a first DC-balanced mode.

FIGS. 1B–1G illustrate the operation of the exemplary pixel 38 of the conventional light valve 10 shown in FIG. 1A operating in a DC-balanced mode during three consecutive display periods. The remaining pixels operate similarly. In one embodiment of a conventional light valve, each display period corresponded to one frame of the input video signal 40. In another embodiment, each display period corresponded to a fraction of one frame of the input video signal. Each display period is composed of an illumination period (ILLUM) and a balance period (BALANCE) having equal durations, as shown in FIG. 1B.

Figure 1C:
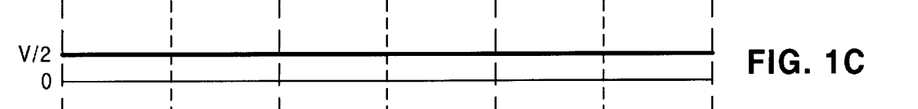
Figure 1D:
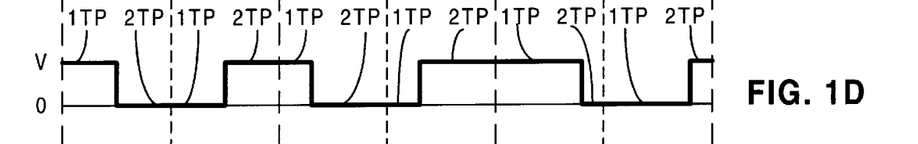

FIG. 1C shows the bias voltage level applied to the transparent electrode 28. In this case, the bias voltage level is kept at a constant level of V/2, so that the changing the voltage applied to the exemplary pixel electrode 38 (as shown in FIG. 1D) from 0 to V reverses the direction of the electric field applied to the ferroelectric liquid crystal layer 36. The level of the drive signal is V for a first temporal portion 1TP of each illumination period. The level of the drive signal is 0 for the second temporal portion 2TP constituting the remainder of the illumination period, and also for the first temporal portion 1TP of the subsequent balance period. The first temporal portion of the balance period has a duration equal to the first temporal portion of the illumination period. However, the level of the drive signal is 0 during the first temporal portion of the balance period, whereas the level of the drive signal is V during the first temporal portion of the illumination period. Finally, the level of the drive signal changes to V for the second temporal portion 2TP constituting the remainder of the balance period. Consequently, during the balance period, the level of the drive signal is 0 and V for times equal to the times that it was at V and 0, respectively, during the illumination period. As a result, the electric field applied to the liquid crystal material of the pixel averages to zero over the display period.

In the example shown, the duration of the first temporal portion 1TP of the drive signal is different in each of the three illumination periods. The duration of the first temporal portion, and, hence, of the second temporal portion, of each illumination period depends on the voltage level of the corresponding sample of the input video signal 40.

Figure 1E:
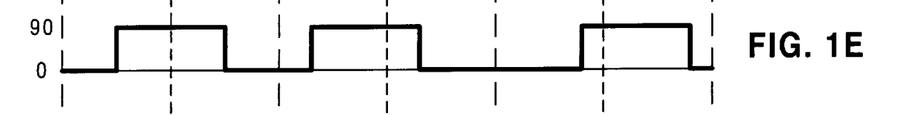

FIG. 1E shows the effect of the spatial light modulator 12 on the direction of polarization of the light impinging on the analyzer 18. The direction of polarization is indicated by the absolute value of the angle a between direction of polarization of the light impinging on the analyzer and the direction of maximum transmissivity of the analyzer. The analyzer transmits light having an angle a close to zero and absorbs light having an angle α close to 90°. In each display period, the angle α has values corresponding to the pixel being bright and dark for equal times due to the need to restore the DC balance of the pixel.

Figures 1F, 1G:
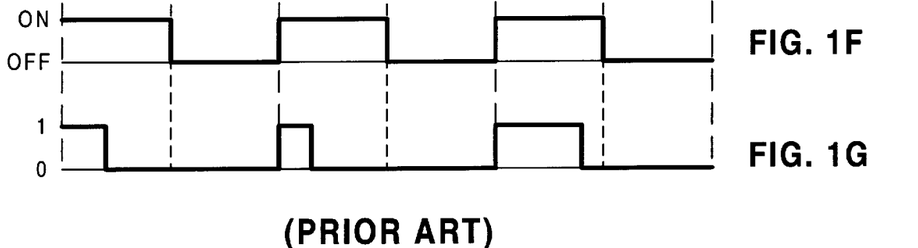

FIG. 1F shows the modulation of the light source 20. The light source is ON throughout the illumination period of each display period, and is OFF during the following balance period.

FIG. 1G shows the light output from the exemplary pixel of the light valve 10 controlled by the pixel electrode 38. Light is output from the pixel only during the first temporal portion of the illumination period of each display period. No light is output during the second temporal portion of the illumination period. Moreover, no light is output during the balance period of the display period because the light source

20 is OFF during the balance period. The light source being OFF for half the display period substantially reduces the perceived maximum brightness of the pixel, and of any image generated by a display device incorporating such a conventional light valve.

Figures 1H, 1I:
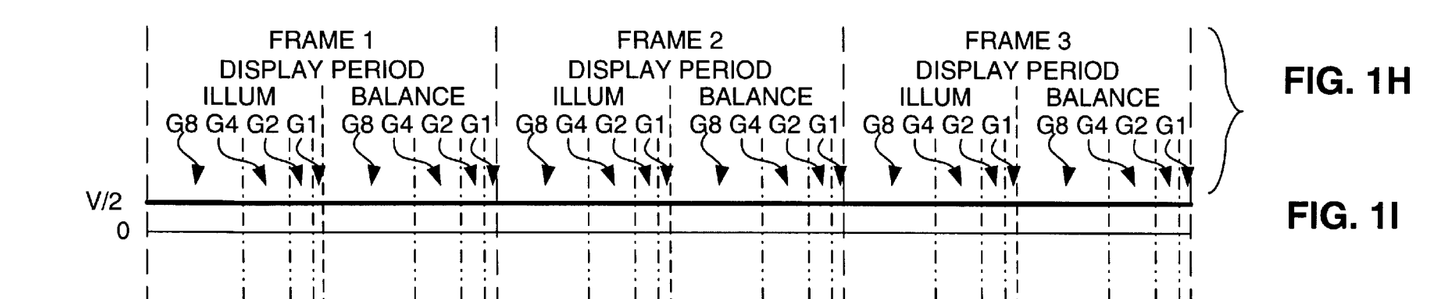
FIGS. 1H–1M illustrate the operation of the conventional reflective light valve shown in FIG. 1A in a second DC-balanced mode.

FIGS. 1H–1M illustrates the operation of the exemplary pixel 38 of the conventional light valve 10 shown in FIG. 1A operating in a known alternative DC-balanced mode during three consecutive display periods. The remaining pixels operate similarly. As with the previously described operation, each display period is composed of an illumination period (ILLUM) and a balance period (BALANCE) having equal durations, as shown in FIG. 1H. Each illumination and balance period, however, is further subdivided into a number of grayscale segments. Each grayscale segment represents the value of a digit in a binary number of a predetermined length. In the example shown, the length of the binary number chosen was four digits and each illumination and balance period was therefore broken into four segments. The first segment G1 is the shortest and represents the value of the binary number 0001. The duration of segment G1 is a fraction of each illumination and balance period determined by the formula:

$$\frac{2^{(d-1)}}{2^n}$$

where d is the position of the digit from the right and n is the total number of digits.

Thus, in our example the duration of the first segment G1 is determined by the value of the first digit and its duration is 1/16 of the illumination or display period. The second segment G2 is determined by the value of the second digit and its duration is 1/8 of the illumination or display period. The third segment G4 is determined by the third digit and its duration is 1/4 of the illumination or display period. Finally, the fourth segment G8 is determined by the value of the fourth digit and its duration is 1/2 of the illumination or display period.

FIG. 1I shows the bias voltage level applied to the transparent electrode 28. In this case, the bias voltage level is kept at a constant level of V/2, so that the changing the voltage applied to the exemplary pixel electrode 38 (as shown in FIG. 1J) from 0 to V reverses the direction of the electric field applied to the ferroelectric liquid crystal layer 36.

Figure 1J:
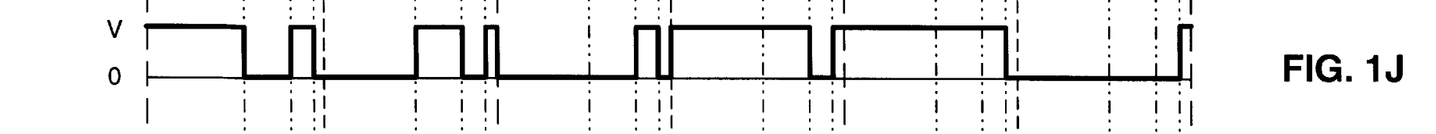

The level of the drive signal is shown in FIG. 1J. In this case the level of grayscale from black to white desired for the output of a particular display period determines which of the grayscale segments have a drive signal with a voltage level of V and which grayscale segments have a drive signal with a voltage of 0. The number of possible gray variations between black and white is dependent on the number of grayscale segments. The are $2^n$ possible gray variations where n is the number of grayscale segments. Thus, with the four grayscale segments shown, there are 16 possible gray variations between black and white. Using binary numerals to represent the 16 possible gray variations, black is represented by 0000 and white would be represented by 1111 with 1010 and 0101 being two possible gray variations representing a gray that is 10/16th white and a gray that is 5/16th white, respectively. The particular level needed is determined from the voltage level of the video signal 40.

Each digit in the binary number also represents the voltage level of the drive signal for the associated grayscale segment, with a 1 representing a drive signal voltage level of V in the associated grayscale segment in the illumination period and a drive signal voltage level of 0 in the associated grayscale segment in the following balance period. A binary 0 represents a drive signal voltage level of 0 in the associated grayscale segment in the illumination period and a drive signal voltage level of V in the associated grayscale segment in the following balance period. representing a voltage level of 0. As a result, the electric field applied to the liquid crystal material of the pixel averages to zero over the display period.

In the example shown, the drive signal for the illumination period of frame 1 has a voltage level of V in grayscale segments G8 and G2 and a voltage level of 0 in grayscale segments G4 and G1, representing the binary numeral 1010. This indicates a grayscale level that is $^{10}/_{16}$ white. The drive signal for the illumination period of frame 2 has a voltage level of V only in grayscale segments G2, representing the binary numeral 0010. This indicates a grayscale level that is $^{2}/_{16}$ white. The drive signal for the illumination period of frame 3 has a voltage level of V in grayscale segments G8, G4, and G2, representing the binary numeral 1110. This indicates a grayscale level that is $^{14}/_{16}$ white.

Figures 1K, 1L:
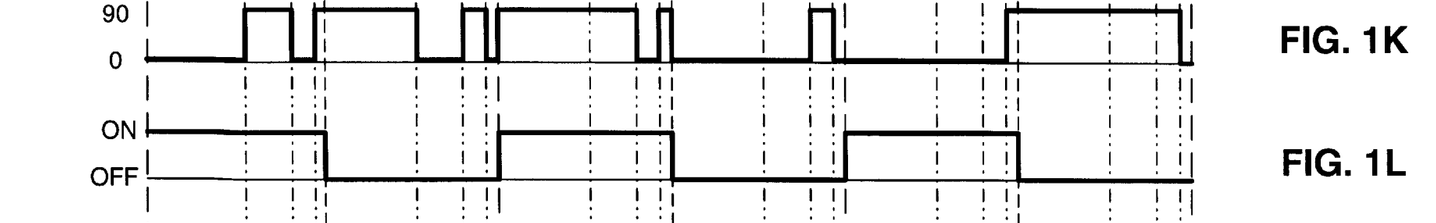

FIG. 1K shows the effect of the spatial light modulator 12 on the direction of polarization of the light impinging on the analyzer 18. The direction of polarization is indicated by the absolute value of the angle α between direction of polarization of the light impinging on the analyzer and the direction of maximum transmissivity of the analyzer. The analyzer transmits light having an angle a close to zero and absorbs light having an angle α close to 90°. In each display period, the angle α has values corresponding to the pixel being bright and dark for equal times due to the need to restore the DC balance of the pixel.

FIG. 1L shows the modulation of the light source 20. The light source is ON throughout the illumination period of each display period, and is OFF during the following balance period.

Figure 1M:
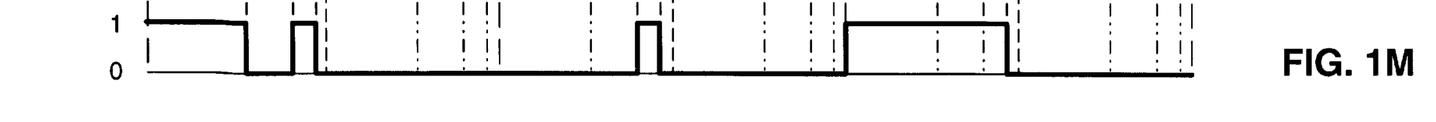

FIG. 1M shows the light output from the exemplary pixel of the light valve 10 controlled by the pixel electrode 38. Light is output from the pixel only during the grayscale segments of illumination period of each display period when the drive signal voltage is V. No light is output during the portions of the illumination period during grayscale segments with a drive signal of 0 volts. Moreover, no light is output during the balance period of the display period because the light source 20 is OFF during the balance period. The light source being OFF for half the display period substantially reduces the perceived maximum brightness of the pixel, and of any image generated by a display device incorporating such a conventional light valve.

The need to maintain the DC balance of the ferroelectric liquid crystal material of the spatial light modulator 12 means that the reflective light valve just described suffers from a similar light throughput problem to the transmissive light valves described above.

One alternative to maintaining the DC balance of the ferroelectric liquid crystal material of the spatial light modulator is to operate the spatial light modulator in a non-DC balanced mode and to "spike" the voltage applied to the transparent electrode 28. Spiking the voltage means that a relatively large positive voltage, as compared to the normal V/2 bias voltage, is applied to the transparent electrode followed immediately by a relatively large negative voltage. Alternatively, the relatively large negative voltage may be applied prior to the relatively large positive voltage. Typical voltage levels applied to the transparent electrode would be V/2=2.5 volts with a spiking voltage of ±6 volts.

Figures 1N, 1O, 1P:
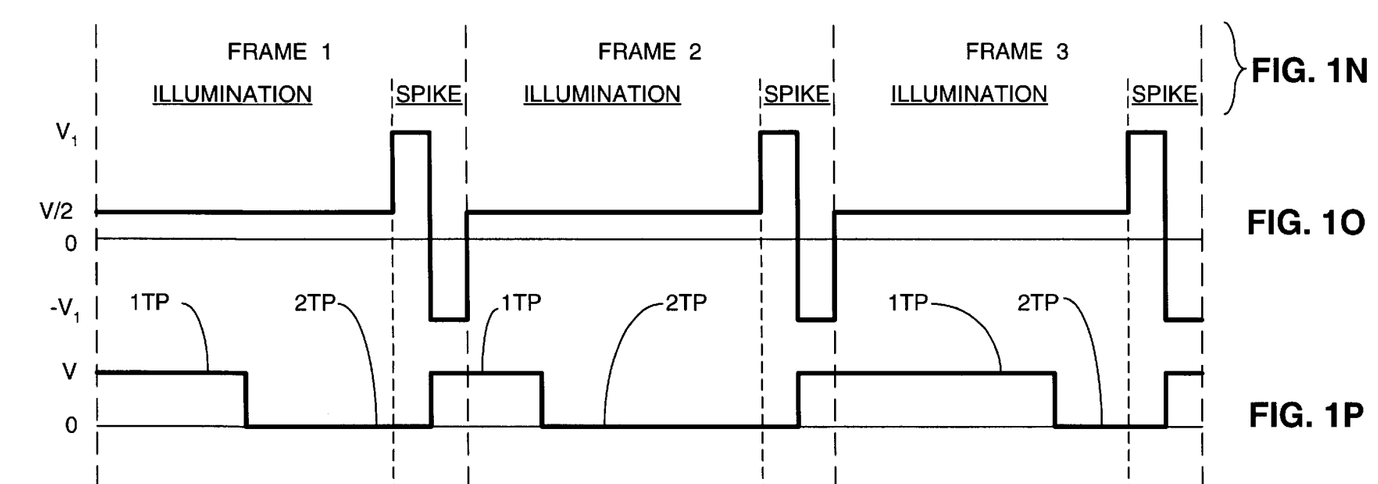
FIGS. 1N–1S illustrate the operation of the conventional reflective light valve shown in FIG. 1A in a non-DC-balanced mode with spiking.

FIGS. 1N–1S illustrate the operation of the exemplary pixel 38 of the conventional light valve 10 shown in FIG. 1A operating in a non-DC-balanced mode during three consecutive display periods. The remaining pixels operate similarly. In one embodiment of a conventional light valve, each display period corresponded to one frame of the input video signal 40. In another embodiment, each display period corresponded to a fraction of one frame of the input video signal. Each display period is composed of an illumination period (ILLUMINATION) and a spiking period (SPIKE) having a substantially shorter duration than the illumination period, as shown in FIG. 1N. The duration of illumination period may be four or more times the duration of the spiking period.

FIG. 1O shows the voltage level applied to the transparent electrode 28. During the illumination period, the voltage applied is kept at a constant level of V/2. During the spiking period, however, the voltage applied is rapidly raised to a positive spiking voltage $V_1$. Roughly halfway through the spiking period, the voltage applied to the transparent electrode is rapidly dropped to a negative spiking voltage $-V_1$ before returning to the V/2 level for the next illumination period.

FIG. 1P shows the voltage applied to the exemplary pixel electrode 38. During the illumination period, changing the applied voltage from 0 to V reverses the direction of the electric field applied to the ferroelectric liquid crystal layer 36. The level of the drive signal is V for a first temporal portion 1TP of each illumination period. The level of the drive signal is 0 for the second temporal portion 2TP constituting the remainder of the illumination period, and also for the first half of the spiking period. Keeping the voltage level of the exemplary pixel at zero volts while the level of the voltage applied to the transparent electrode is at spiking voltage $V_1$ maximizes the electric field applied across the ferroelectric liquid crystal material 36, postponing the onset of pixel sticking. Finally, the level of the drive signal changes to V for the second half of the spiking period, corresponding to the application of the negative spiking voltage $-V_1$ to the transparent electrode. This maximizes the reverse electric field applied across the ferroelectric liquid crystal material 36, postponing the onset of pixel sticking.

In the example shown, the duration of the first temporal portion 1TP of the drive signal is different in each of the three illumination periods. The duration of the first temporal portion, and, hence, of the second temporal portion, of each illumination period depends on the voltage level of the corresponding sample of the input video signal 40.

Figure 1Q:
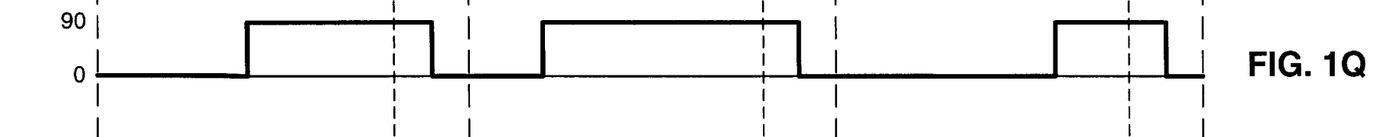

FIG. 1Q shows the effect of the spatial light modulator 12 on the direction of polarization of the light impinging on the analyzer 18. The direction of polarization is indicated by the absolute value of the angle α between direction of polarization of the light impinging on the analyzer and the direction of maximum transmissivity of the analyzer. The analyzer transmits light having an angle α close to zero and absorbs light having an angle α close to 90°. In each display period, the angle α has values corresponding to the pixel being bright and dark for unequal times and operation is said to be in a non-DC-balance mode.

Figure 1R:
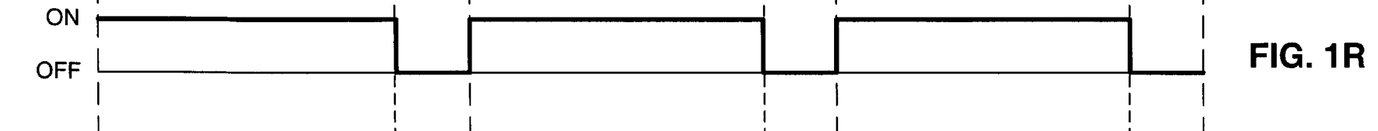

FIG. 1R shows the modulation of the light source 20. The light source is ON throughout the illumination period of each display period, and is OFF during the following spiking period.

Figure 1S:
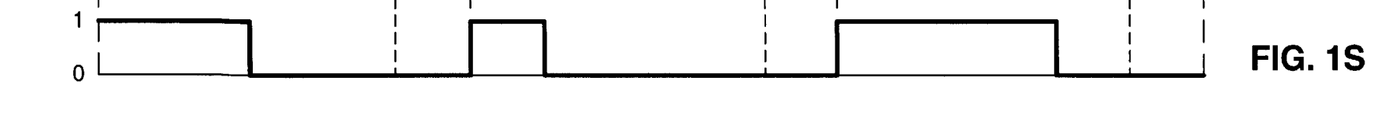

FIG. 1S shows the light output from the exemplary pixel of the light valve 10 controlled by the pixel electrode 38. Light is output from the pixel only during the first temporal portion of the illumination period of each display period. No light is output during the second temporal portion of the illumination period. Moreover, no light is output during the spiking period of the display period because the light source 20 is OFF during the spiking period. The light source being ON for substantially more than half the display period substantially improves the perceived maximum brightness of the pixel for a given light source 20 over the same light valve operating in a DC balanced mode. Similarly, the image generated by a display device incorporating a light valve operating in a non-DC-balanced mode would be substantially brighter (nearly twice as bright) as the same display device incorporating a light valve operating in a DC-balanced mode.

An alternative non-DC-balanced mode with spiking would be to utilize the previously described segmented grayscale operation (not shown) in place of the two temporal periods 1 TP and 2 TP shown in FIG. 1P.

Figure 2A:
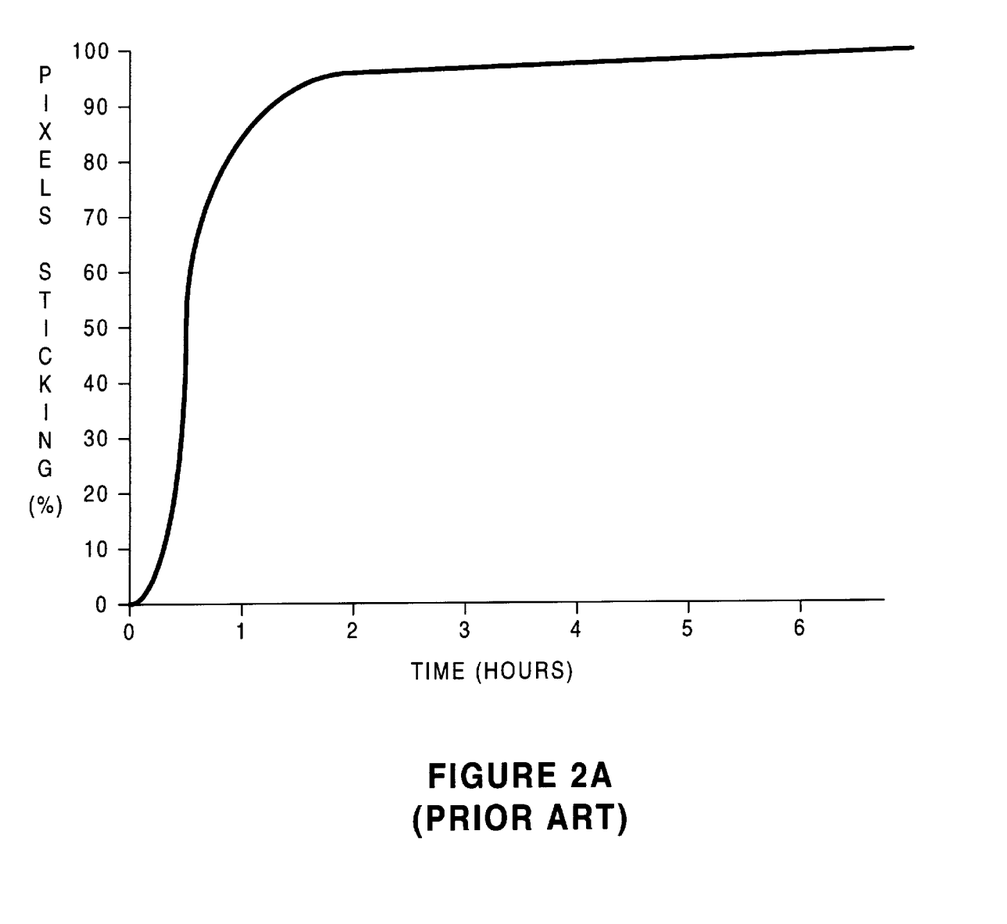
FIG. 2A is a graph indicating the level of pixel sticking over time with a conventional spatial light modulator operating in a non-DC-balanced mode without spiking.

A light valve operating in a non-DC-balanced mode with spiking certainly improves the performance of the light valve over similar light valves working in a non-DC-balanced mode without sticking by substantially delaying the onset of pixel sticking. FIG. 2A is a graph showing the onset of pixel sticking over time in a light valve operating in a non-DC-balanced mode without spiking. Substantial pixel sticking can be observed in the light valve within a half hour of operation.

Figure 2B:
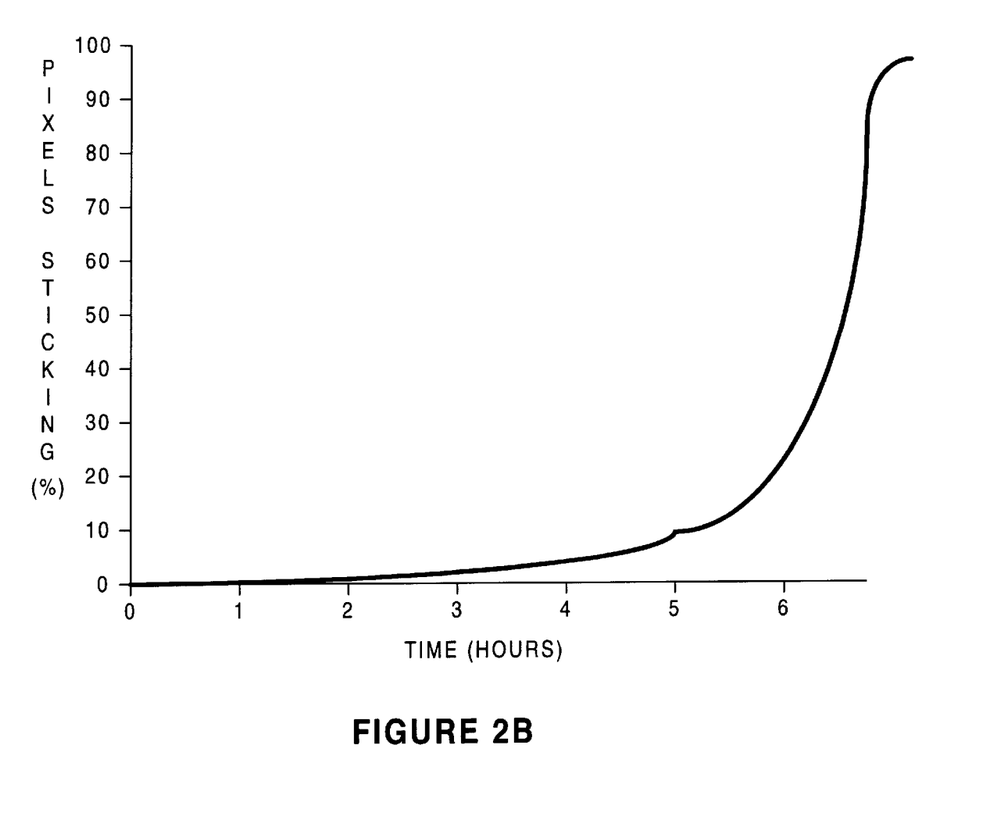
FIG. 2B is a graph indicating the level of pixel sticking over time with a conventional spatial light modulator operating in a non-DC-balanced mode with spiking.

FIG. 2B is a graph showing the onset of pixel sticking over time in a similar light valve operating in a non-DC-balanced mode with spiking. The onset os pixel sticking is delayed and does not become a significant problem until after nearly 5 hours of operation.

While spiking provides a delay in on the onset of pixel sticking, the onset of pixel sticking within hours still makes non-DC-balanced operation of a ferroelectric liquid crystal-based spatial light modulator unpractical for most display applications. Consequently, what is needed is a ferroelectric liquid crystal-based light valve that can operate in a non-DC-balanced mode for extended periods without pixel sticking.

SUMMARY OF THE INVENTION

The invention provides a ferroelectric liquid crystal-based spatial light modulator that comprises a transparent electrode, a pixellated electrode, ferroelectric liquid crystal material, and a heater. The ferroelectric liquid crystal material is sandwiched between the transparent electrode and the pixellated electrode. The heater is capable of heating the ferroelectric material to at least 40° C. and preferably to between 50 and 60° C. If the pixellated electrode is transparent, the spatial light modulator will be a transmissive spatial light modulator, and if the pixellated electrode is reflective, the spatial light modulator will be a reflective spatial light modulator. The spatial light modulator according to the invention, whether transmissive or reflective, has decreased pixel sticking when operated in a non-DC-balanced mode with spiking.

The invention may also provide a temperature sensor for detecting the temperature of the spatial light modulator and a temperature control circuit that is electrically connected to both the temperature sensor and the heater. One type of temperature sensor which may be used is a diode located proximate to the pixellated electrode. The control circuit would then detect the temperature of the spatial light modulator by by monitoring the changes in the current-voltage characteristics of the diode. Alternatively, a photo-diode located remote from the spatial light modulator may be used as an indirect temperature sensor. The photo-diode would be located and aligned to monitor the response time of the ferroelectric liquid crystal material. The control circuit would then use the state change time to determine the temperature of the ferroelectric liquid crystal material.

The spatial light modulator according to the invention may further provide a thermally conductive substrate having a first major surface and a substantially parallel second major surface. The first major surface supports the pixellated electrode, while the second major surface supports the heater. Alternatively, the substrate may encapsulate the heater. In both cases, the thermal energy of the heater is conducted to the liquid crystal material through the substrate.

The invention also provides a method of decreasing pixel sticking in a ferroelectric liquid crystal-based spatial light modulator operating in a non-DC-balanced mode. The method according to the invention comprises first providing a ferroelectric liquid crystal-based spatial light modulator including a transparent electrode, a pixellated electrode, and ferroelectric liquid crystal material sandwiched between the transparent electrode and the pixellated electrode. Next, the ferroelectric liquid crystal material is preheated to at least 40° C. The spatial light modulator is then operating in a non-DC-balanced mode, and the voltage applied to the transparent electrode is spiked periodically. Operating in a non-DC-balanced mode may include illuminating the spatial light modulator for at least 70 percent of its operating time. Finally, the ferroelectric liquid crystal material is heated as required in order to maintain a predetermined temperature above 50° C.

Maintaining the predetermined temperature may include monitoring the temperature of the spatial light modulator. Monitoring the temperature of the spatial light modulator may be accomplished by providing a temperature monitoring diode with the spatial light modulator and detecting changes in a current-voltage characteristic of the temperature monitoring diode. Alternatively, monitoring the temperature of the spatial light modulator may include providing a photo-diode remote from the spatial light modulator, and detecting the response time of the ferroelectric liquid crystal material.

The method according to the invention may provide that the step of spiking the voltage applied to the transparent electrode additionally includes two substeps. The first substep is applying a positive spiking voltage to the transparent electrode while applying about zero volts to the pixellated electrode during a first portion of time when the spatial light modulator is not illuminated. The second substep is applying a negative spiking voltage to the transparent electrode while applying a positive voltage to the pixellated electrode during a second portion of time when the spatial light modulator is not illuminated.

Accordingly, the spatial light modulator according to the invention operates at an elevated temperature to reduce pixel sticking when operating in a non-DC-balanced mode with spiking. Other features and advantages of the present invention will become apparent from the following detailed description, taken in conjunction with the accompanying drawings, illustrating, by way of example, the principles of the invention.

DETAILED DESCRIPTION OF THE INVENTION

The invention is based, in part, on the inventor's discovery that pixel sticking in ferroelectric liquid crystal spatial light modulators operated in a non-DC-balanced mode is greatly reduced when the spatial light modulator is operated at a temperature above about 50° centigrade. In addition, pixel sticking is further reduced when the spatial light modulator is preheated to near the operating prior to operating the spatial light modulator. Preheating the spatial light modulator has the additional advantages that contrast and grayscale resolution are also improved in the spatial light modulator when operated in both the DC-balanced and non-DC-balanced modes.

Figure 3:
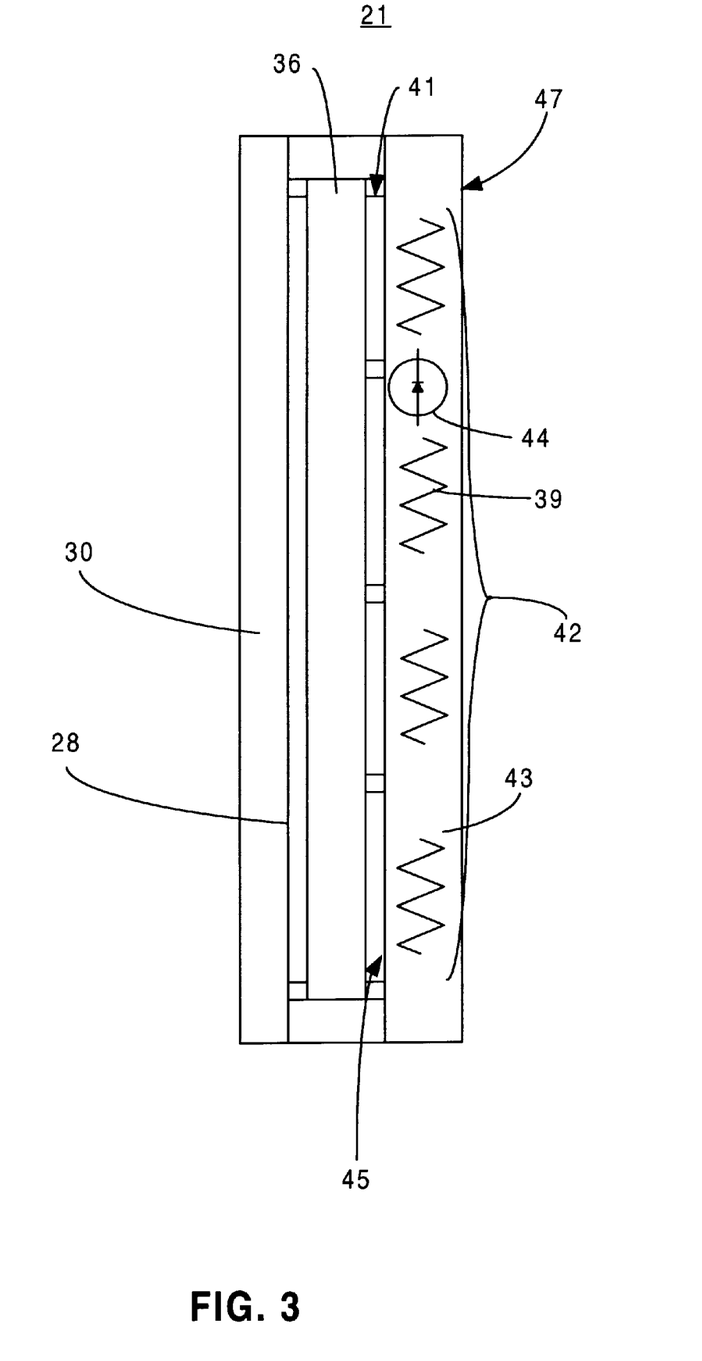
FIG. 3 is a schematic diagram of a light valve incorporating of heated spatial light modulator with a temperature sensor according to a first embodiment of the invention.

FIG. 3 is a schematic diagram showing part of a display device incorporating a first embodiment of the spatial light modulator 21 according to the invention. The spatial light modulator can be incorporated into various types of display devices, including miniature, wearable devices, cathode-ray tube replacements, and projection displays. The spatial light modulator can be operated nearly indefinitely in a non-DC-balanced mode without pixel sticking. The non-DC-balanced operation allowing the spatial light modulator to be illuminated up to 90 percent or more of the time, which enables a display device incorporating the spatial light modulator according to the invention to have a maximum brightness of nearly twice that obtained using a conventional DC-balanced spatial light modulator.

Figure 4:
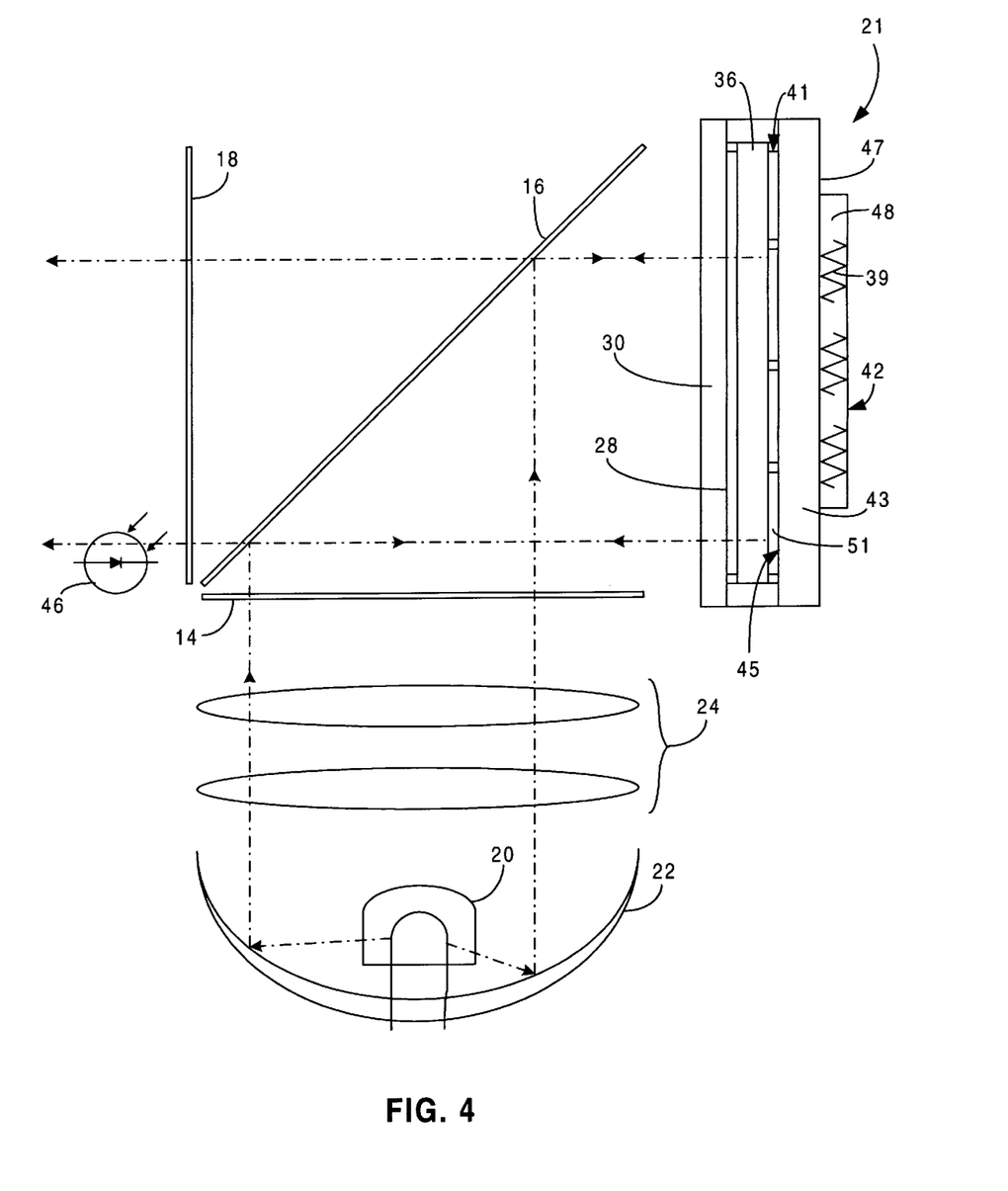
FIG. 4 is a schematic diagram of a light valve incorporating of heated spatial light modulator with a temperature sensor according to a second embodiment of the invention.

Elements of the portion of the display device shown in FIGS. 3–4 that are identical to elements of the conventional light valve shown in FIG. 1A are indicated by the same reference numerals and will not be described again here.

The spatial light modulator includes a transparent electrode 28 deposited on the surface of a transparent cover 30, a pixellated electrode 41 supported by a first major surface 45 of a substrate 43, ferroelectric liquid crystal (FLC) material 36 sandwiched between the transparent electrode and the pixellated electrode, and a heater 42. The pixellated electrode is divided into a two-dimensional array of pixel electrodes that define the pixels of the spatial light modulator. A substantially reduced number of pixel electrodes is shown to simplify the drawing. For example, in a light valve for use in a large-screen computer monitor, the reflective electrode could be divided into a two-dimensional array of 1600×1200 pixel electrodes.

A drive circuit (not shown), which may be located in the substrate 43, applies a drive signal to the pixel electrode of each pixel of the spatial light modulator 21. The drive signal has two different voltage levels, and the transparent electrode 28 is maintained at a fixed potential mid-way between the voltage levels of the drive signal when the spatial light modulator is illuminated. The potential difference between the pixel electrode and the transparent electrode establishes an electric field across the part of the liquid crystal layer 36 between the pixel and transparent electrodes. The direction of the electric field determines whether the liquid crystal layer rotates the direction of polarization of the light reflected by the pixel electrode, or leaves the direction of polarization unchanged.

The drive circuit also allows voltage level applied to the transparent electrode 28 to be spiked during a spiking period when the spatial light modulator is not illuminated. As used in this application, the phase "not illuminated" may not be a literal darkening of the spatial light modulator, but instead refers to a period of time when any image displayed by the spatial light modulator is hidden from a viewer. This is most often accomplished by modulating the light source itself, thus literally darkening the spatial light modulator, but can also be accomplished in any manner that prevents the light reflected from the spatial light modulator from forming an image.

Spiking the voltage applied to the transparent electrode involves raising the voltage applied to the transparent electrode to a positive spiking voltage above the fixed potential held during the illumination period, and lowering the voltage applied the transparent electrode to a negative spiking voltage below the a fixed potential held during the illumination period. Preferably, the positive spiking voltage is greater than the larger of the two drive signal voltages, and the negative spiking voltage is lower than the smaller of the two drive signal voltages. In addition, when the voltage applied to the transparent electrode is raised to the positive spiking voltage, the drive signal may be set at the lower of its two voltage levels to maximize the electric field across the ferroelectric liquid crystal layer 36. Similarly, when the voltage applied to the transparent electrode is lowered to the negative spiking voltage, the drive signal may be set at the higher of its two voltage levels to maximize the opposite electric field across the ferroelectric liquid crystal layer 36.

Spiking the voltage applied to the transparent electrode may also include applying the negative spiking voltage before the positive spiking voltage and may additionally include multiple applications of positive spiking voltages and negative spiking voltages during each spiking period.

The heater 42 heat the liquid crystal material 36 of the spatial light modulator 21 to at least 40° centigrade prior to operating the spatial light modulator and maintains the temperature of the liquid crystal material at a predetermined level, preferably greater than 50° centigrade once the spatial light modulator is operating. As used in this application, the spatial light modulator is "operating" when an electric field is applied across the liquid crystal material. The heater 42 is preferably configured to keep the spatial light modulator heated at all times so that a warm-up period can be avoided prior to operating the spatial light modulator.

The heater 42 may be of any type known in the art, but preferably includes at least one resistive element 39 which may be imbedded in or encapsulated by the substrate 43. The formation of resistive elements in semiconductor substrates is known in the art. The substrate is preferably configured to conduct the heat generated by the heater to the pixellated electrode 41 and the ferroelectric liquid crystal material 36.

The spatial light modulator may also include a temperature control circuit (not shown). The temperature control circuit is electrically connected to the heater 42 and to a temperature sensor for detecting the temperature of the spatial light modulator. In the first embodiment of the invention depicted in FIG. 3, the temperature sensor is a diode 44. The diode is preferably located within the substrate 43 proximate to the pixellated electrode 41. The formation of diodes in a semiconductor substrate is known in the art. The diode may be part of the drive circuit previously discussed or may be formed specifically for use by the temperature control circuit. In either case, the temperature control circuit preferably uses changes in the current-voltage characteristics of the diode to determine the temperature of the spatial light modulator.

Referring now to FIG. 4, a second embodiment of the spatial light modulator 21 according to the invention is depicted within a portion of a display device. The second embodiment of the invention is substantially similar to the embodiment depicted in FIG. 3, except for the position of the heater 42 and the type of temperature sensor used. In the spatial light modulator depicted, the heater is a heater block 48 which preferably includes a number of resistive heater elements 39. The heater block is supported by a second major surface 47 of the substrate 43 which is substantially parallel to the first major surface 45. The heater block may also be affixed to the second major surface. As discussed above, the substrate is preferably configured to conduct the heat generated by the heater 42 to the pixellated electrode 41 and the ferroelectric liquid crystal material 36.

The temperature sensor of the spatial light modulator 21 may be a photo-diode 46. The photo-diode is located remote from the spatial light modulator, preferably with an analyzer 18 interposed between the photo-diode and the spatial light modulator. The photo-diode is preferably located and arranged so that light generated by the light source 20 and modulated by the spatial light modulator falls on the photo diode 46 if it is transmitted by the analyzer 18. In this way, the photo-diode will be illuminated when the electric field between the pixellated electrode 41 and the transparent electrode 28 is in one direction, and will not be illuminated when the electric field is in the other direction.

When the electric field between the pixellated electrode 41 and the transparent electrode 28 switches direction, some of the properties of the liquid crystal material 36 sandwiched between the pixellated electrode and the transparent electrode will quickly change. For example, changing the direction of the electric field will changed the degree to which the liquid crystal material rotates the direction of polarization of light passing through it. The length of time it takes for the properties of the ferroelectric liquid crystal material 36 to change after a change in the direction of the electric field ("response time") is related to the temperature of the liquid crystal material.

In this embodiment, the temperature control circuit receives a signal from the drive circuit when the electric field changes direction. The length of time between receiving this signal and the photo-diode 46 recording a change in illumination is used by the temperature control circuit to calculate the temperature of the liquid crystal material. The use of the photo-diode 46 has the advantage over the use of the diode 44, discussed previously, inasmuch as the photo-diode can be used to calculate the temperature of the liquid crystal material 36 itself, while the diode 44 merely provides a close approximation of the temperature of the liquid crystal material by giving the temperature of a location proximate to the pixellated electrode 41.

In FIG. 4, the spatial light modulator 21 depicted is a reflective spatial light modulator having a reflective pixellated electrode 41. The pixellated electrode 44 and substrate 43 could also be transparent, in which case the spatial light modulator would be a transmissive spatial light modulator. When the spatial light modulator is a transmissive spatial light modulator, care must be taken that the heater 42 does not interfere with transmission of light through the modulator. Transparent heaters are known that create heat by running a current through a transparent conductor such as indium-tint-oxide (ITO). In addition, using a photo-diode 46 to monitor temperature of the liquid crystal material 36 minimizes potential transmissive interference that might be caused by the diode 44.

Figure 5:
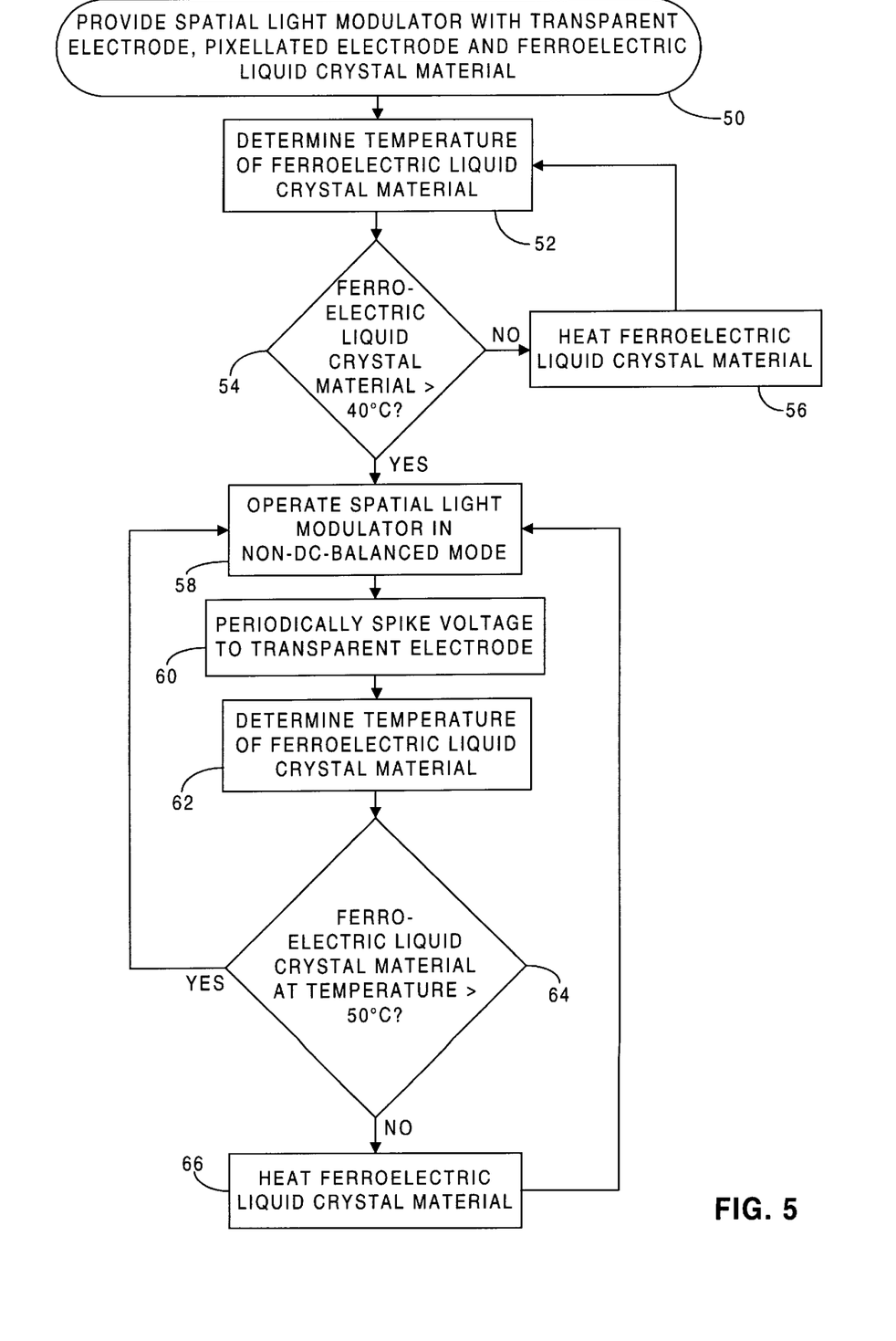
FIG. 5 is a flowchart depicting a method of reducing pixel sticking in a spatial light modulator operated in a non-DC-balanced mode with spiking.

FIG. 5 is a flowchart depicting the method according to the invention of minimizing pixel sticking in a non-DC-balanced spatial light modulator. The method begins by providing a ferroelectric liquid crystal-based spatial light modulator. The spatial light modulator provided should include a transparent electrode, a pixellated electrode, and ferroelectric liquid crystal material sandwiched between the transparent electrode and the pixellated electrode (block 50). Next, the temperature of the ferroelectric liquid crystal material must be determined (block 54). This may be accomplished using any number of techniques including the use of a photo-diode 46 or a diode 44 as discussed above. For purposes of this description, finding a close approximation of the temperature of the liquid crystal material by determining the temperature of other components of the spatial light modulator is considered a valid method of determining the temperature of the liquid crystal material.

Next, the spatial light modulator should be preheated to a temperature above 40° C. (blocks 54 and 56). This preheating needs to take place because even after a spatial light modulator has been heated to an temperature above 50° C., pixel sticking may occur if the spatial light modulator that has been operated at room temperature in a non-DC-balanced mode prior to heating. In addition, it may take a conventional unheated spatial light modulator more than a half hour to reach a stable operating temperature once it has begun to operate from room temperature. The stable operating temperature of a conventional "unheated" spatial light modulator may be around 30° C. when used with a "cool" light source. This temperature is reached due to the heat generated by the drive circuits. The stable operating temperature of a conventional "unheated" spatial light modulator may be around 55° C. when used with a "hot" light source. This long warmup time typically causes undesirable contrast and grayscale resolution changes, as discussed in detail below.

For purposes of this description, preheating may include not only heating the spatial light modulator before operation, but also may include keeping the spatial light modulator heated to an operating or near operating temperature during "standby" periods. Standby periods may include periods where the light source of the display device is turned off for energy savings reasons, and where reactivation may occur with little or no warmup period.

An additional advantage to preheating the is improved contrast and grayscale resolution in the output of the display device incorporating the spatial light modulator according to the invention. In virtually all projection display applications, the spatial light modulator is optically located between two crossed polarizing devices, such as the polarizer 14 and the analyzer 18 in FIG. 1A and 4. The display device is configured such that one of the crossed polarizing devices, the analyzer, blocks the polarized light that has been either rotated or not rotated (depending on the configuration) by the spatial light modulator. The angle of rotation imparted by a spatial light modulator on a direction of polarization will vary with operating temperature. Typically, the amount of rotation will vary in a given spatial light modulator by about 1 or 2 degrees between rotation at room temperature and rotation at operating temperature (>50° C.). When a spatial light modulator is preheated to an operating temperature, it may be optimized to provide maximum contrast at operating temperature without the need to consider performance of the spatial light modulator during a substantial warmup period.

In addition, the response time of the ferroelectric liquid crystal gets shorter as the temperature of the ferroelectric liquid crystal increases. As discussed above, the number of possible gray variations is $2^n$ where n is the number of grayscale segments. As the number of grayscale segments n increases, however, the duration of the shortest segment G1 decreases. This is because the duration of grayscale segment G1 is equal to $½^n$th of the illumination period. Thus, a shorter response time allow this shortest duration grayscale segment G1 to be shorter than would be possible with longer response times. Accordingly, a ferroelectric liquid crystal-based spatial light modulator is capable of more gray variations (grayscale resolution) at operating temperature than would be possible at room temperature or other temperatures below operating temperature.

Once the spatial light modulator has been preheated, it may be operated in a non-DC-balanced mode (block 58) by forming an electric field between the transparent electrode 28 and the pixellated electrode 41. While operating the spatial light modulator in a non-DC-balanced mode, the spatial light modulator may be illuminated for somewhat more than half of each display period. It is preferred that the spatial light modulator be illuminated for at least 70 percent of each display period, and as much as 90 percent illumination has been successfully demonstrated over a several week period without significant pixel sticking.

During the portion of each display period when the spatial light modulator is not illuminated (spiking period), the voltage applied to the transparent electrode 28 should be spiked (block 60). As discussed previously, spiking the voltage applied to the transparent electrode involves raising the voltage applied to the transparent electrode to a positive spiking voltage above the fixed potential held during the illumination period, and lowering the voltage applied the transparent electrode to a negative spiking voltage below the a fixed potential held during the illumination period. Preferably, the positive spiking voltage is greater than the larger of the two drive signal voltages, and the negative spiking voltage is lower than the smaller of the two drive signal voltages. Spiking may include applying the negative spiking voltage before the positive spiking voltage and may additionally include multiple applications of positive spiking voltages and negative spiking voltages during each spiking period.

Spiking that voltage applied to the transparent electrode preferably includes two steps that can be done in either order. The first step is applying a positive spiking voltage to the transparent electrode while the drive circuit applies the lower of the two voltage potentials to the pixellated electrode. The second step is applying a negative spiking voltage to the transparent electrode while the drive circuit applies a positive voltage to the pixellated electrode. Each of the two steps preferably take roughly equal time to complete and may be repeated several times during a spiking period. The positive spiking voltage is typically around 6 volts and the negative spiking voltage is typically around –6 volts, but the magnitude of both may be made substantially higher. The higher of the two drive circuit voltages applied to the pixellated electrode is typically around 5 volts, while the lower of the two drive circuit voltages applied to the pixellated electrode is typically around 0 volts. These voltages are usually a function of the drive circuits formed in the substrate, which is usually silicon, and will not typically vary by more than a few volts.

While the spatial light modulator is operating in a non-DC-balanced mode, the temperature of the ferroelectric liquid crystal material should be monitored to ensure it remains at temperature above 50° C. (block 62 and 64). Monitoring the temperature may be done in the same manner as determining the temperature of block 52, described above. Monitoring the temperature of the liquid crystal material 36 is particularly important in display applications where heat from the light source 20 and heat generated by the drive circuit (not shown) may combine to maintain an operating temperature above 50° C. In these applications, continuing to heat the liquid crystal material with the heater 42 may result in overheating and damaging the spatial light modulator.

If the temperature begins to drop below the operating temperature, it may be heated with heater 42 (block 66).

Although this disclosure describes illustrative embodiments of the invention in detail, it is to be understood that the invention is not limited to the precise embodiments described, and that various modifications may be practiced within the scope of the invention defined by the appended claims.

I claim:

1. A ferroelectric liquid crystal-based spatial light modulator with decreased pixel sticking, when operated in a non-DC-balanced mode with spiking, comprising:

a transparent electrode;

a pixellated electrode;

ferroelectric liquid crystal material sandwiched between the transparent electrode and the pixellated electrode; and a heater capable of preheating the ferroelectric liquid crystal material to raise the temperature of the ferroelectric liquid crystal material to a temperature of at least 40° C. prior to the non-DC-balanced operation of the spatial light modulator, wherein the preheating of the ferroelectric liquid crystal material reduces pixel sticking due to the non-DC-balanced operation of the spatial light modulator.

2. The spatial light modulator of claim 1, in which the heater is capable of maintaining the ferroelectric liquid crystal material at a temperature above 50° C.

3. The spatial light modulator of claim 1, additionally comprising:

a temperature sensor; and a temperature control circuit electrically connected to the temperature sensor and the heater.

4. The spatial light modulator of claim 3, in which the temperature control circuit is configured to maintain the temperature of the liquid crystal material at between 50 and 60° C.

5. The spatial light modulator of claim 4, in which the temperature sensor includes a temperature monitoring diode with current-voltage characteristics that vary with temperature, the temperature monitoring diode being located proximate to the pixellated electrode.

6. The spatial light modulator of claim 4, in which the temperature sensor includes a photo-diode to monitor a state change time of the ferroelectric liquid material.

7. The spatial light modulator of claim 1, additionally comprising:

a thermally conductive substrate having a first major surface and a substantially parallel second major surface,
the first major surface supporting the pixellated electrode,
the second major surface supporting the heater.

8. The spatial light modulator of claim 1, additionally comprising:
a substrate encapsulating the heater and having a first major surface supporting
the pixellated electrode.

9. The spatial light modulator of claim 1, wherein the pixellated electrode is transparent and the spatial light modulator is a transmissive spatial light modulator.

10. The spatial light modulator of claim 1, wherein the pixellated electrode is reflective and the spatial light modulator is a reflective spatial light modulator.

11. A method of minimizing pixel sticking in a ferroelectric liquid crystal-based spatial light modulator operating in a non-DC-balanced mode, the method comprising:
a) providing a ferroelectric liquid crystal-based spatial light modulator including a transparent electrode, a pixellated electrode, and ferroelectric liquid crystal material sandwiched between the transparent electrode and the pixellated electrode;
b) operating the ferroelectric liquid crystal-based spatial light modulator in a non-DC-balanced mode;
c) spiking the voltage applied to the transparent electrode periodically; and
d) heating the ferroelectric liquid crystal material as required to maintain a temperature above 50° C. while operating the spatial light modulator in a non-DC-balanced mode, wherein said heating reduces pixel sticking in the spatial light modulator due to the non-DC-balanced operation of the spatial light modulator.

12. The method as in claim 11, additionally comprising:
preheating the spatial light modulator prior to performing step b.

13. The method as in claim 12, in which the preheating heats the liquid crystal material to at least 40° C.

14. The method as in claim 11, in which operating the spatial light modulator in a non-DC-balanced mode in step b) includes:
illuminating the spatial light modulator during at least 70 percent of a display period.

15. The method as in claim 11, in which step d) includes monitoring the temperature of the spatial light modulator.

16. The method as in claim 15, in which:
the spatial light modulator provided in step a) additionally includes a temperature monitoring diode proximate to the pixellated electrode; and
monitoring the temperature of the spatial light modulator in step d) includes detecting changes in a current-voltage characteristic of the temperature monitoring diode.

17. The method as in claim 15, in which monitoring the temperature of the spatial light modulator of step d) additionally includes:

providing a photo-diode remote from the spatial light modulator; and
detecting the state change time of the ferroelectric liquid crystal material.

18. The method as in claim 14, in which spiking the voltage applied to the transparent electrode in step c) additionally includes:
applying a positive spiking voltage to the transparent electrode while applying about zero volts to the pixellated electrode during a first portion of time when the spatial light modulator is not illuminated; and
applying a negative spiking voltage to the transparent electrode while applying a positive voltage to the pixellated electrode during a second portion of time when the spatial light modulator is not illuminated.

19. For a spatial light modulator that includes a transparent electrode, a pixellated electrode, and ferroelectric liquid crystal material sandwiched between the transparent electrode and the pixellated electrode, a method of minimizing pixel sticking in the spatial light modulator, the method comprising:
a) operating the spatial light modulator in a non-DC-balanced mode;
b) preheating the ferroelectric liquid crystal material to raise the temperature of the ferroelectric liquid crystal material to at least a first temperature before operating the spatial light modulator in the non-DC-balanced mode; and
c) heating the ferroelectric liquid crystal material to at least a second temperature greater than the first temperature while operating the spatial light modulator in a non-DC-balanced mode, wherein said preheating and heating of the ferroelectric liquid crystal material reduce pixel sticking in the spatial light modulator due to the non-DC-balanced operation of the spatial light modulator.

20. The method of claim 19, wherein the first temperature is 40° C. and the second temperature is 50° C.

21. The method as in claim 19, wherein heating the ferroelectric liquid crystal material comprises monitoring the temperature of the spatial light modulator.

22. The method as in claim 21, wherein the spatial light modulator includes a temperature monitoring diode proximate to the pixellated electrode, and wherein monitoring the temperature of the spatial light modulator includes detecting changes in a current-voltage characteristic of the temperature monitoring diode.

23. The method as in claim 21, wherein monitoring the temperature of the spatial light modulator includes:
providing a photo-diode remote from the spatial light modulator; and
detecting the state change time of the ferroelectric liquid crystal material.

* * * * *